United States Patent [19]

Fisher, Jr. et al.

[11] Patent Number: 4,881,088
[45] Date of Patent: Nov. 14, 1989

[54] PLOTTER PEN INK LEVEL DETECTOR

[76] Inventors: Paul C. Fisher, Jr., 785 Marita Dr., Boulder City, Nev. 89005; Wiebe H. Van Der Meer, Van Zijldreef 47, Postbus 64, 3980 CB Bunnik, Netherlands; Paul C. Fisher, 711 Yucca St., Boulder City, Nev. 89005

[21] Appl. No.: 240,056
[22] Filed: Aug. 26, 1988
[51] Int. Cl.⁴ ............................................. G01D 15/16
[52] U.S. Cl. ............................ 346/140 R; 346/139 R; 346/139 C; 200/82 E; 200/84 C; 116/110; 116/264; 137/558; 222/51; 73/305
[58] Field of Search .......... 346/140 R, 140 A, 140 IJ, 346/140 PD, 139 C, 139 R; 200/82 E, 84 C; 116/204, 110; 137/558; 118/694; 401/141, 142; 222/51, 62, 67; 73/305, 309, 314

[56] References Cited
U.S. PATENT DOCUMENTS

| | | | |
|---|---|---|---|
| 3,046,475 | 1/1962 | Binford | 324/44 |
| 3,242,474 | 3/1966 | Gast | 222/51 |
| 3,389,603 | 6/1968 | Jacobs | 73/308 |
| 3,939,482 | 2/1976 | Cotter | 346/139 C |
| 3,942,526 | 3/1976 | Wilder | 200/84 C |
| 4,035,789 | 7/1977 | Akita | 340/244 R |
| 4,290,059 | 9/1981 | Noyes | 340/621 |
| 4,350,458 | 9/1982 | Murahara | 401/145 |
| 4,615,303 | 10/1986 | Sackett | 123/41.15 |

Primary Examiner—H. Broome
Assistant Examiner—Scott A. Rogers
Attorney, Agent, or Firm—Quirk, Tratos & Roethel

[57] ABSTRACT

In a computer controlled automatic plotting device, an ink level detector is provided in a plotter pen cartridge. An ink-following object is provided in the plotter pin cartridge and is supported by the writing fluid. The ink-following object carries a magnet. As the ink-following object traverses down the inside of the plotter pen cartridge, the position of the magnet triggers a sensor at a predetermined level. The sensor then effects a visual or audible signal to alert an operator that the cartridge is running out of writing fluid. Alternatively, the sensor activates a control system to shut down the plotting device to permit replacement of the plotter pen cartridge with one having a new ink supply.

14 Claims, 3 Drawing Sheets

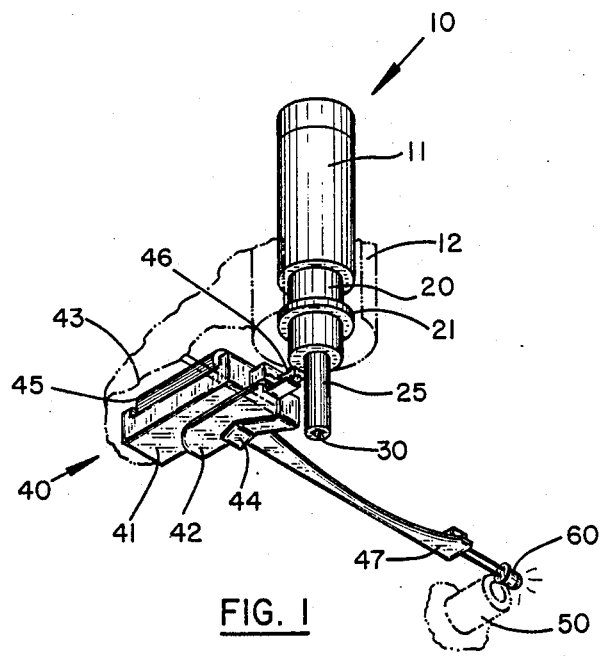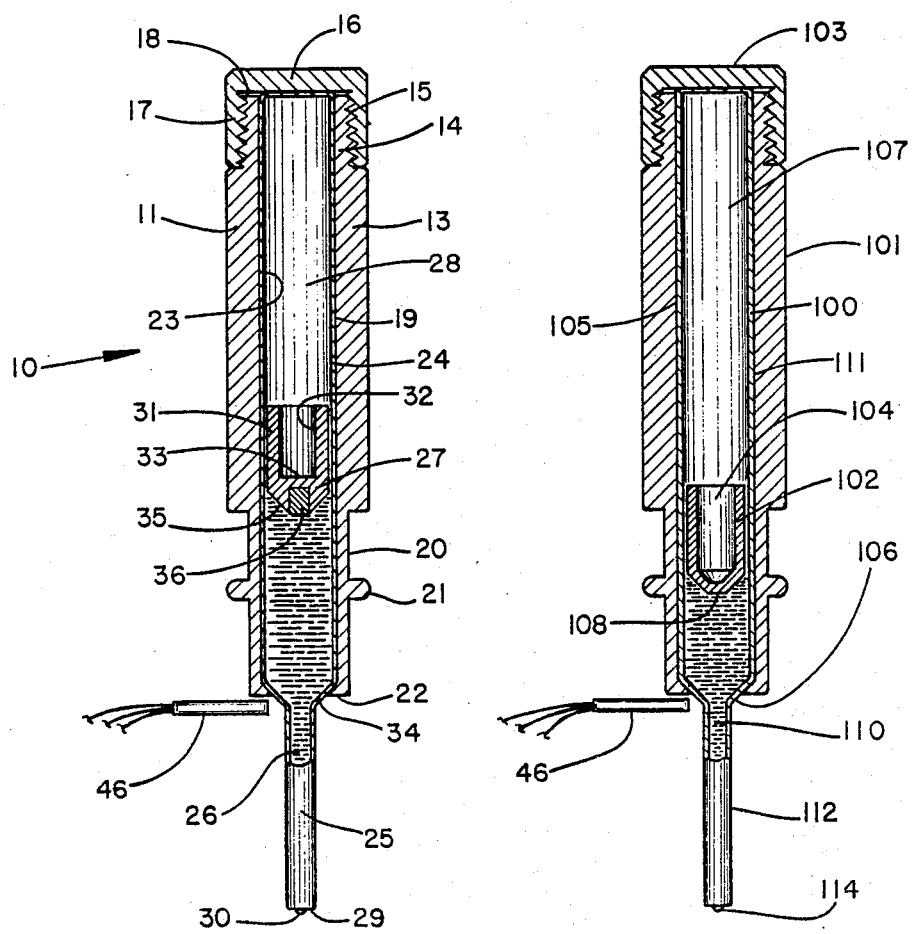

PLOTTER PEN INK LEVEL DETECTOR

BACKGROUND OF THE INVENTION

Computer-controlled automatic plotting machines have come into wide application in recent years. The writing instrument used in these machines is known as a plotter pen. The plotter pen is mounted, either singularly or in combination with other plotter pens if multicolored drawings are required, on the plotting machine at a location where the writing tip of the pen can come into contact with paper or other writing surface. Each plotter pen contains a cartridge having a discrete supply of writing fluid During the course of a computer-controlled creation of a drawing, it is possible that a plotter pen cartridge may run out of writing fluid. If the operator is not aware of the depletion of writing fluid, the plotting machine will continue to operate but a drawing will not be created. Should this result occur, both time is wasted and additional expense is incurred in having to redo the drawing.

Plotter pens are also used in other applications such as chart recorders placed on oil and gas wells or used in electric power and chemical plants. A depletion of the supply of writing fluid would result in the loss of critical data necessary for the operation of the well or the plant.

In order to minimize the possibility of the writing fluid supply being depleted in the middle of a project, operators have been replacing the plotter pen while it still has a usable quantity of writing fluid left inside. This is not cost efficient and also increases the amount of time that the plotting machine or chart recorder is out of service for maintenance

DESCRIPTION OF THE PRIOR ART

It is known to provide motor-driven fountain pens with a magnetic sensor that triggers a micro-switch to disengage the driving motor when the ink supply becomes depleted; e.g. U.S. Pat. No. 4,350,458 to Murahara et al. Magnets used in combination with reed-switches or microswitches to sense either fluid level or fluid flow are also common. For example, U.S. Pat. No. 4,290,059 to Noyes discloses using a magnetic sensing device that triggers a visual alarm when the level of an oil storage tank decreases to a certain point. Complementarily, a similar detector can be used to sense when a storage container has been filled to a predetermined level as in U.S. Pat. No. 3,389,603 to Jacobs. Magnetic sensor devices used in a fluid flow environment are disclosed in U.S. Pat. No. 4,615,303 to Sackett.

It is also known to provide computer-controlled plotter pens with a transparent ink reservoir so that an operator may visually determine how much ink is remaining. However, this approach requires constant monitoring by the operator to both notice when the plotter pen begins to run low on ink and then replace the ink supply before the pen runs out and the drawing is ruined.

Many expensive plotters keep track of the plotting time. The plotter operator attempts to determine a minimum plot time and then remove the pen before the ink supply runs out. This approach does not always produce good results because of variations that cannot be anticipated by the operator The volume of the ink supply contained in a plotter pen can vary from pen to pen during the manufacture of each pen. The quantity of ink laid down varies depending on the type of pen point used, as well as on the type of material used as the writing surface. The speed and complexity of the plotting affects the amount of ink used; long straight lines plot faster and use up more ink than do short lines or lettering. In order to have a safety margin, operators may throw away pens that still have one-third to one-half of their ink supply remaining.

SUMMARY OF THE INVENTION

The object of this invention is to overcome the drawbacks of the prior art by providing a plotter pen assembly with magnetic sensing means that alerts the operator when the ink supply has reached a predetermined level. Another object is to utilize the magnetic sensing means in combination with a control device that allows unattended operation of a computer-controlled automatic plotter by providing for automatically discontinuing the operation of the plotter when the ink supply runs out thereby preventing the drawing having to completely be redone.

The magnetic sensing means of the present invention is carried by an ink-following object that follows the column of ink inside the cartridge of the plotter pen assembly. As the ink supply is depleted, the ink-following object passes adjacent to a magnet sensing device. When the magnet sensing device senses the magnet carried by the ink-following object, a signal is sent to an alarm to either visually or audibly alert the operator that the ink supply has reached a predetermined level. Alternatively, the magnet sensing device sends a signal to a control device that automatically shuts down the plotter to permit replacement of the ink supply. A new plotter pen assembly having a full ink supply is then manually or automatically put into service. Once the ink supply is replaced, the plotter can be restarted at the point it was stopped and the drawing can be completed.

BRIEF DESCRIPTION OF THE DRAWINGS

FIG. 1 shows in perspective the present invention with the magnetic sensing means connected to a visual alarm.

FIG. 2 shows a sectional view of the plotter pen assembly embodying the present invention.

FIG. 3 shows a sectional view of a second embodiment of the plotter pen assembly of the present invention.

DETAILED DESCRIPTION OF THE INVENTION

Figure 4:
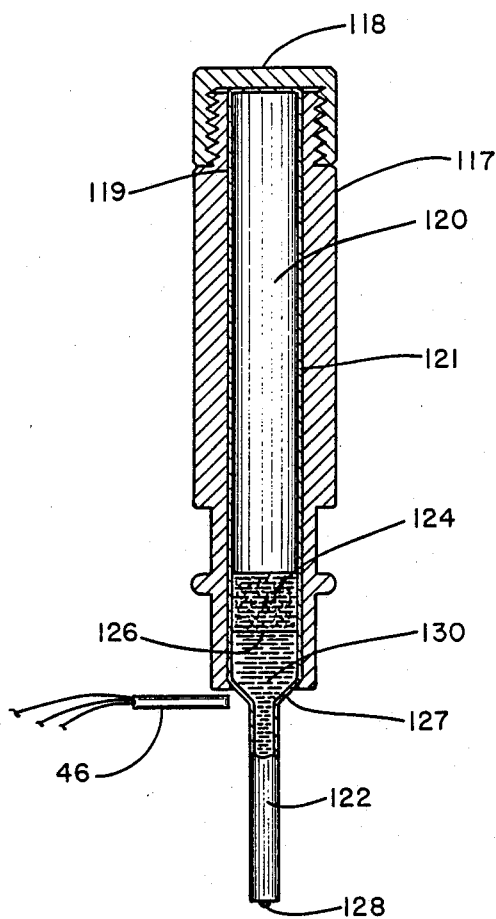
FIG. 4 shows a sectional view of a third embodiment of the plotter pen assembly of the present invention.

FIG. 1 shows a perspective view of the overall plotter pen assembly 10 in combination with a magnetic sensing device assembly 40. The plotter pen assembly 10 comprises a cylindrical elongated cartridge holder 11 adapted to be carried by a cylindrical elongated mounting 12 (shown in phantom) that forms a part of a conventional computer controlled plotting device. A typical computer controlled automatic plotting device, on which the present invention can be used, is Calcomp Model 1043.

The plotter pen assembly 10 is shown in cross section in FIG. 2. The holder 11 has a main cylindrical body portion 13 with an extension 14 at the upper end. The extension 14 is threaded on its exterior surface 15. A U-shaped cap 16 fits over the upper end of the main body portion 13. The cap 16 has an extension 17 which is threaded on its internal surface 18. The cap 16 screws onto the upper end of the main body portion 13 to close the upper end of the holder 11. The main body portion 13 and the cap 16 cooperate to form a cylindrical hollow interior chamber 19.

The lower end of the holder 11 comprises a lower portion 20. A circular flange 21 is provided at approximately the mid-point along the length of lower portion 20. The flange 21 cooperates with a ridge (not shown) on the inside of mounting 12 which retains the holder 11 in the mounting 12. The bottom end of the lower portion 20 is provided with a circular lip 22 that projects inwardly radially to provide a lip or flange which supports a pen cartridge 23 mounted in the chamber 19.

When the cap 16 is removed, a pen cartridge 23 can be inserted into the hollow interior chamber 19. The pen cartridge 23 has a cylindrical upper reservoir 24 that has a diameter slightly smaller than the diameter of the hollow interior chamber 19. The length of the upper reservoir 24 approximates the length of the hollow chamber 19. The pen cartridge 23 has a lower reservoir 25 depending coaxially from the upper reservoir 24. The lower reservoir 25 is defined by a hollow cylindrical tube whose cross-section is smaller than the cross-section of the upper reservoir 24. The hollow interiors of the upper reservoir 24 and the lower reservoir 25 align coaxially to form a continuous chamber that contains the writing fluid 26, the ink following object 27 and compressed gas 28. The lower end 29 of the lower reservoir 25 is shaped to provide a mounting surface that holds a ball point 30. The ball point 30 is set in a conventional socket arrangement that allows the ball to rotate and thus distribute writing fluid on a writing surface (not shown).

The magnetic sensing device assembly 40 is positioned so that the sensor 46 is adjacent the plotter pen assembly 10 at a point just below the circular lip 22 on the bottom end of lower portion 20 which is the point where the upper reservoir 24 joins the lower reservoir 25. The magnetic sensing device assembly 40 is mounted to a portion of the structure of the plotting device in any conventional manner. The sensor 46 can be a reed switch, a Hall-effect sensor, a magnetoresistive sensor or any one of a number of conventional proximity switches that use mechanical means to operate a switch in response to either a magnet or a magnet-attracting material coming into proximity to the switch. Suitable Hall-effect sensors are Micro-Switch Model #SS41 or Sprague Model #UGN 3013T and Model #UGN 3013U. Suitable magnetoresistive sensors are Micro-Switch Model #SS21PE and Model #SS22PE. The actuation of the sensor 46 causes electrical current to flow to the alarm indicator 60. The alarm indicator can be any conventional device that gives a visual signal, such as a light emitting diode (LED) or a light bulb, or an audible signal, such as a bell or buzzer.

FIG. 1 shows a preferred embodiment of the magnetic sensing device assembly 40. A conventional battery holder 41 has secured thereto a clamp 42 designed to be attached to a beam 43 (shown in phantom) which forms part of the computer-controlled automatic plotting apparatus. The clamp 42 has an associated spring clip 44 that fastens the clamp 42 and holder 41 to the beam 43. The holder has mounted therein batteries 45 that are connected in a conventional manner to a sensor 46. One end of an arm 47 is connected to the holder 41; the other end is connected to an alarm indicator 60. The arm 47 is extended a certain length along beam 43 to a position remote from the position of the cartridge holder 11. This construction provides working space for the alarm indicator 60 to be mounted on the arm 47. An alarm response device 50 (shown in phantom) can be mounted adjacent to the alarm indicator 60 at this remote location.

Referring again to FIG. 2, the operation of the present invention will now be described. A writing fluid 26, which is a conventional ball-point ink used in pressurized cartridges, is contained in both a portion of the upper reservoir 24 and in the lower reservoir 25. An ink-following object 27 rests on the top of, and is supported by, the writing fluid 26.

The outer surface 31 of the ink-following object 27 is shaped as a cylinder to conform to the interior shape of the upper reservoir 24. The upper end of the ink-following object 27 is hollow and open at the top to minimize its overall weight, although an ink-following object 27 with a solid upper end can also be used. The bottom of the ink-following object 27 has a conically tapered surface 35 that conforms to the inwardly tapered neck portion 34 of the lower end of the upper reservoir 24 where it joins the lower reservoir 25. The tapered neck portion 34 of the upper reservoir 24 abuts the circular lip 22 to prevent the pen cartridge 23 from sliding out of the cartridge holder 11.

The cross-section of the upper reservoir 24 is much larger than the cross-section of the lower reservoir 25. Therefore a greater portion of the initial supply of writing fluid 26 is contained in the upper reservoir 24. As the writing fluid 26 is depleted, the ink-following object 27 will ride downwardly in the upper reservoir 24 toward the neck portion 34 of the pen cartridge 23.

In the preferred embodiment of the present invention, the pen cartridge 23 should be replaced when the supply of writing fluid 26 is depleted from the upper reservoir 24 and remains only in the lower reservoir 25. In order to detect this condition, the ink-following object 27 is provided with a magnet means such as a magnetic insert 36. This magnetic insert 36 can be attached to ink-following object 27 by any conventional means such as being press fit into an opening provided in ink-following object 27 for that purpose. The ink-following object may be fabricated from any suitable material, and is preferably plastic such as polyethylene, polyvinylchloride or polystyrene.

The magnetic insert 36 can be a magnet, such as Micro-Switch Model #103MG 5 which is an 0.08" ×0.08" ×0.04" cube. In a preferred embodiment, the Micro-Switch magnet 36 is used with a Micro-Switch magnetoresistive sensor 46. The sensor 46 will detect the magnetic insert 36 at a range of between about 0.12" and 0.10".

When the ink-following object 27 rides downwardly in the upper reservoir 24 to the inwardly tapered neck portion 35 of the pen cartridge 23, the magnetic insert 36 comes into proximity with the sensor 46. The magnetic field generated by the magnetic insert 36 activates the sensor 46 which causes a switch to close in the magnetic sensing device 40 which causes the actuation of the alarm indicator 60. An operator standing near the alarm indicator 60 will notice the alarm and can then shut down the plotting device until the pen cartridge 23 has been replaced.

FIG. 3 shows a second embodiment of the present invention in which the ink-following object 102 comprises a cylindrical cup fabricated entirely of magnetic material. A cartridge holder 101 and a threaded cap 103 cooperate to form a cylindrical hollow interior chamber 105 in which is mounted a hollow cylindrical pen cartridge 100. By action of compressed gas 107, writing fluid 110 is forced downwardly in the upper reservoir 111 of the cartridge 100 into a lower reservoir 112 which depends coaxially from the upper reservoir 111. The lower end of the lower reservoir 112 is shaped at its end to provide a mounting surface that holds a ballpoint 114. The ink-following object 102 rides down the interior of the upper reservoir 111 as the writing fluid 110 is depleted. The magnetic sensing device assembly 40 is activated when the bottom edge 108 of the ink-following object 102 comes into proximity with the sensor 46 which is positioned adjacent to the inwardly tapered neck portion 106 of the cartridge 100.

A third embodiment of the present invention is shown in FIG. 4. A cartridge holder 117 and a threaded cap 118 cooperate to form a hollow interior chamber 119 in which is mounted a hollow cylindrical pen cartridge 120 having an upper reservoir 121 and a lower reservoir 122 joined together by an inwardly tapered neck portion 127. The bottom end of the lower reservoir 122 has mounted therein a ball point 128. The ink-following object 124 is disposed above the writing fluid 130 in the upper reservoir 121 and comprises a body of non-magnetic fluid in which are suspended magnetic particles. The non-magnetic fluid should be a material, such as grease, which is non-miscible with the writing fluid 130. The magnetic particles can be any conventional magnetic substance, such as iron filings, that when mixed with the grease material will remain suspended in the grease. The magnetic sensing device assembly 40 will be activated when the bottom edge 126 of the ink-following object 124 comes into proximity with the sensor 46 which is positioned adjacent to the inwardly tapered neck portion 127 of the pen cartridge 120.

The present invention has been described in the context of a pressurized pen assembly in which compressed gas assists the flow of the writing fluid to the ball point. However, the invention is also adaptable to a non-pressurized pen cartridge. In a non-pressurized pen cartridge, the plotter pen assembly would be the same as that shown in FIG. 2, but both the cap 16 and the top of the cartridge 19 would be open to the atmosphere and no compressed gas would be used. The ink-following object 27 and the sensor 46 would, in a non-pressurized pen cartridge, function identically to the manner in which each functions as shown in FIG. 2. The alternate embodiments of the present invention shown in FIG. 3 or 4 could similarly be provided with a non-pressurized pen cartridge 100 or 120, respectively.

The invention as described involves the use of an ink-following object that has magnetic properties in cooperation with a sensor that can detect the presence of a magnetic body. Alternatively, the ink-following object can be formed, in whole or in part, of material which is magnet-attracting. For example, iron, tool steel, 416 stainless steel or a plastic embedded with such materials. A suitable material is Wilson Fieberfil #G-1/SS/10 or#G-50/SS/20.

It is known in computer controlled automatic plotting devices to use writing means other than ball points. The present invention is adaptable to the plotting devices that use felttipped pen cartridges as well as those that use liquid ink pens such as the Rapidograph pen cartridges made by Koh-i-noor Corp. The ink-following object of the present invention needs only to be disposed within the pen cartridge at the end of the writing material, whether it be liquid or solid, and the sensor is mounted adjacent the pen cartridge at a pre-selected location to be able to sense that the writing material has been depleted to a level at which it is necessary to replace the pen cartridge. The various embodiments of ink-following objects, made of either magnetic or magnetic-attracting material, provide those skilled in the art with many options from which to select the option that works best with a particular pen cartridge.

Additionally, the ink level detection system of the present invention can also be used in chart recorder apparatus. Chart recorders use plotter pens very similar to plotter pens used in computer controlled automatic plotting devices. The plotter pens used in chart recorders can easily be adapted to contain an ink-following object. A magnetic sensing device can be provided to sense the depletion of the ink level in the plotter pen used in the chart recorder. The magnetic sensing device can be connected by appropriate electronic circuitry, such as that shown in FIGS. 5 or 6, to the controls of the chart recorder to automatically deactivate the chart recorder, and additionally, preferably, to activate an audio or visual signal to alert an operator of the chart recorder's deactivation.

Figure 5:
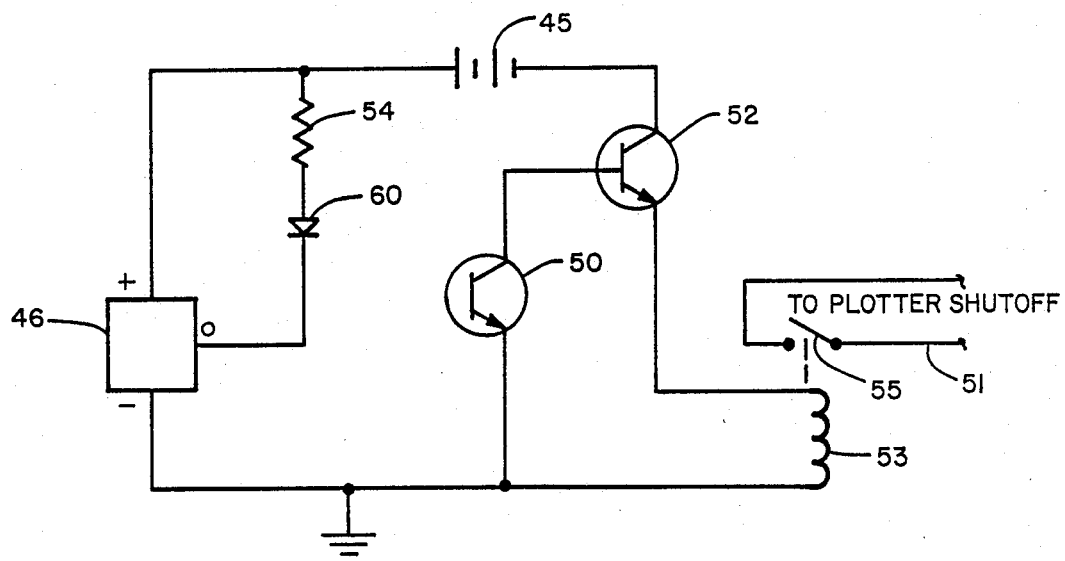
FIG. 5 shows in schematic an electronic circuit for controlling the plotter in accordance with the present invention.

FIG. 5 depicts in schematic an electrical circuit to control the operation of a plotting device in response to a signal detected by a sensor 46. The sensor 46 is a Hall-effect type sensor and is connected in parallel with the plotter shutoff switch 55 which is connected at 51 to the remainder of the computer controls (not shown) of the automatic plotting device and both are powered by a 9V battery power source 45. An LED 60 is connected in series with a 1500K ohm resistor 54 between the battery 45 and the sensor 46. The LED 60 is activated when the sensor 46 detects the proximity of the magnet means carried on the ink-following object. A photo transistor 50, in response to light from the LED 60, permits current to flow to a 2N2222 transistor 52. This flow of current activates the transistor 52 which permits further current flow to a 500 ohm, 9V relay 53. The action of the relay 53 causes the plotter shutoff switch 51 to open from its normally closed position, thereby deactivating the plotter operation.

Figure 6:
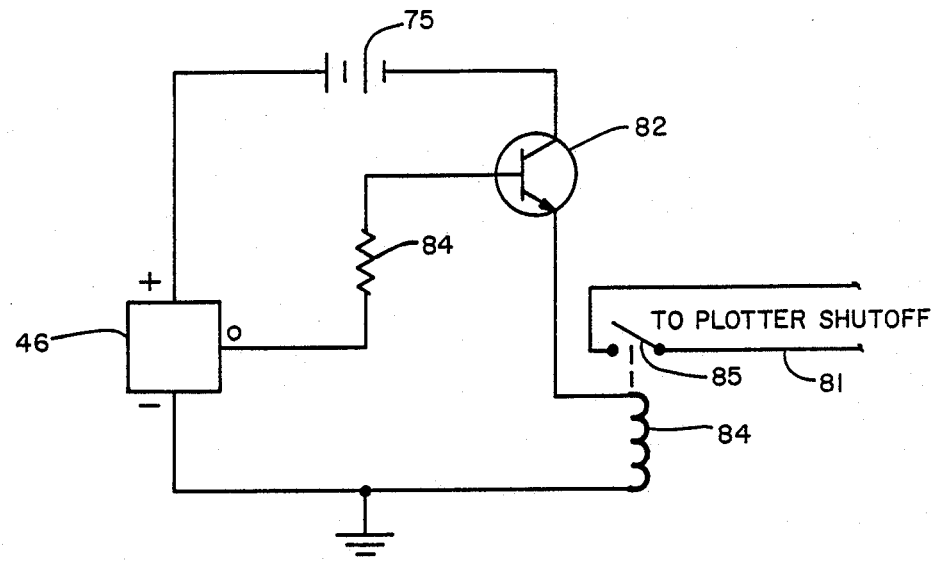
FIG. 6 shows in schematic an alternate embodiment of the plotter control circuit.

FIG. 6 shows an alternate embodiment of the plotter control circuitry in which the Hall-effect sensor 46 is hardwired directly into a computer-controlled automatic plotting device (not shown). When the sensor 46 detects the proximity of the magnet means on the ink-following object, current flows through a 500K ohm resistor 84 to a 2N2222 transistor 82. The activation of transistor 82 permits current to flow from a 9V battery 75 to a 500 ohm, 9V relay 84. The action of relay 84 causes the plotter shutoff switch 85, which is normally closed, to open thereby deactivating the plotter operation through the connection at 81 of the plotter shutoff switch 85 to the remainder of the computer controls (not shown) of the automatic plotting device.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

WE CLAIM:

1. A writing apparatus comprising:
   a) a hollow elongated cartridge, 23
   b) writing means located at an end portion of the cartridge, 30
   c) a column of writing fluid contained in the cartridge adjacent to the writing means, 26
   d) ink-following object means contained in the cartridge and supported by the writing fluid, 27
   e) magnet means carried by the ink-following object means; and 36
   f) means for sensing the location of the magnet means whereby the level of the column of writing fluid can be determined. 46

2. The apparatus as described in claim 1 where the ink-following object means is a non-magnetic solid material and the magnet means is a magnet mounted on the ink-following object means.

3. The apparatus as described in claim 1 where the ink-following object means is formed of magnetic material.

4. The apparatus as described in claim 1 where the ink-following object means is a non-magnetic liquid and the magnet means comprises magnetic particles mixed with the nonmagnetic liquid.

5. The apparatus as described in claim 1 where the means for sensing the location of the magnet means includes circuit means for signaling audibly when the column of writing fluid becomes depleted to a predetermined level.

6. The apparatus as described in claim 1 wherein the means for sensing the location of the magnet means includes circuit means for signaling visually when the column of writing fluid becomes depleted to a predetermined level.

7. In combination with a computer-controlled automatic plotting apparatus, a plotter pen writing apparatus having means for stopping the operation of the plotter when the writing fluid is depleted to a predetermined quantity comprising:
   a) a hollow elongated housing,
   b) writing means located at an end portion of the cartridge,
   c) a column of writing fluid contained in the cartridge adjacent to the writing means,
   d) ink-following object means contained in the cartridge and supported by the writing fluid,
   e) magnet means carried by the ink-following object means; and
   f) means for sensing the location of the magnet means whereby when the writing fluid supply becomes depleted to a predetermined quantity the plotting device is automatically stopped to permit replacement of the writing fluid.

8. The combination as described in claim 7 where the ink-following object means is a non-magnetic solid material and the magnet means is a magnet mounted on the ink-following object means.

9. The combination as described in claim 7 where the ink-following object means is formed of magnetic material.

10. The combination as described in claim 7 where the ink-following object means is a non-magnetic liquid and the magnet means comprises magnetic particles mixed with the nonmagnetic liquid.

11. The combination as described in claim 7 where the means for sensing the location of the magnet means is a Hall-effect sensor, a magnetoresistive sensor or a magnetic proximity switch.

12. The combination as described in claim 11 further including:
   a) switch means for deactivating the plotting device in response to a signal from the mean for sensing the location of the magnet means; and
   b) computer control means for controlling the plotting device in response to the switch means.

13. Apparatus for sensing the depletion of writing fluid in a plotter pen in a computer controlled automatic plotting device comprising:
   (a) a pen cartridge having an elongate hollow housing defining an internal chamber and having writing means mounted at an end portion thereof,
   (b) a quantity of writing fluid contained in the chamber,
   (c) ink-following object means supported by the writing fluid in the chamber,
   (d) magnet means carried by the ink-following object means,
   (e) means for sensing the location of the magnet means, said sensing means mounted exteriorly of the cartridge adjacent a lower portion thereof,
   (f) switch means activated by the magnet sensing means when the ink-following object means reaches a predetermined location in the cartridge, and
   (g) alert means for indicating a low writing fluid level condition in the cartridge.

14. The apparatus as described in claim 13 further comprising a shutoff means electrically connected to the switch means and the alert means for automatically deactivating the plotting device when the ink-following object means reaches a predetermined location in the cartridge.

* * * * *